No. 856,768. PATENTED JUNE 11, 1907.
F. B. COMINS.
SPOON.
APPLICATION FILED FEB. 19, 1906.

Witnesses.
Raphael G. Blanc.
Frederick E. Weynellis

Inventor.
Frank B. Comins
By Henry J. Miller
atty.

UNITED STATES PATENT OFFICE.

FRANK B. COMINS, OF SHARON, MASSACHUSETTS.

SPOON.

No. 856,768.   Specification of Letters Patent.   Patented June 11, 1907.

Application filed February 19, 1906. Serial No. 301,966.

*To all whom it may concern:*

Be it known that I, FRANK B. COMINS, of Sharon, in the county of Norfolk and State of Massachusetts, have invented certain new and useful Improvements in Spoons; and I hereby declare that the following is a full, clear, and exact description of the same, reference being had to the accompanying drawings, forming part of this specification.
This invention has reference to spoons or similar implements adapted for use in mixing and compounding operations.

The object of the invention is to so construct the mixing implement that the temperature of the mixture may be indicated.

Another object of the invention is to provide a mixing spoon or implement, having a bowl and a handle with a thermometer.

The invention consists in such novel features of construction and combination of parts as shall hereinafter be more fully described and pointed out in the claims.

Figure 1:
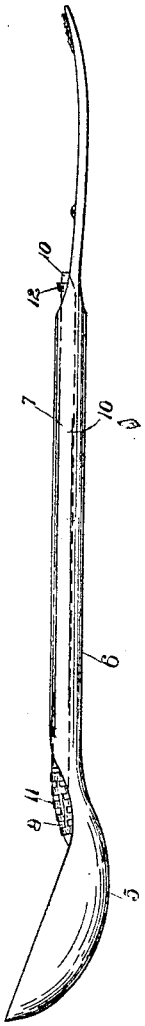
Figure 2:
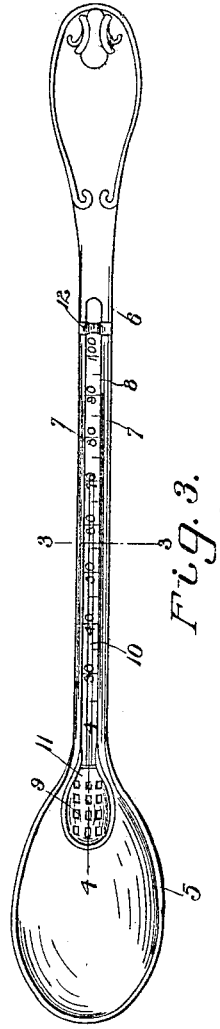
Figure 3:
Figure 4:
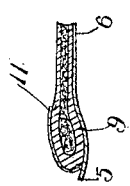

Figure 1, represents a side view of the improved mixing implement. Fig. 2, represents a plan view of the same. Fig. 3, represents a cross sectional view taken on line 3—3, Fig. 2. Fig. 4, represents a longitudinal sectional view of parts of the implement taken on line 4—4 Fig. 2.
Similar numerals of reference designate corresponding parts throughout.

In carrying this invention into practice in its preferred form I construct a spoon having a bowl 5 of suitable shape and proportions for the use of which it is intended and having the handle 6, the material at the edge portions of which is bent up to form overlapping lips 7—7 between which is the opening 8. Located in the bowl 5, and preferably conforming somewhat to the shape of said bowl, is a thermometer bulb 9, furnished with mercury or other well known material adapted to expand under heat, and having a tubular stem 10 extending along the handle 6 and partially embraced by the lips 7—7 of the handle; this tubular stem 10 is furnished with graduations indicating degrees of heat. In order to protect the bulb 9 from fracture, I prefer to provide the bulb 9 or the bowl 5, with the guard 11 shaped to fit over the bulb.

The thermometer bulb 9 and its tube 10 are preferably secured to the spoon during its manufacture, the lips 7—7 being bent over the tube 10, but I do not limit myself to this, or any other specific method, of securing the thermometer as I am aware that the lips 7—7 may be omitted, the thermometer being held in place at one end by the guard 11 and by clamps similar to that shown at 12, the main purpose of utilizing the bent over lips 7—7 being that the handle 6 is strengthened by such conformation and that the tube 10 is protected by the edges of the lips 7—7.

Having thus described my invention, I claim as new and desire to secure by Letters Patent.

The combination with a spoon having a bowl and an open tubular stem extending therefrom, of a thermometer bulb located in the bowl and having a tube extending into said stem, and a guard covering said bulb, as and for the purpose described.

In testimony whereof I affix my signature in presence of two witnesses.

FRANK B. COMINS.

Witnesses:
 CHARLES B. CUMMINGS,
 H. J. MILLER.